US009400563B2

(12) United States Patent
Lee et al.

(10) Patent No.: US 9,400,563 B2
(45) Date of Patent: Jul. 26, 2016

(54) APPARATUS AND METHOD FOR RECOGNIZING SUBJECT MOTION USING A CAMERA

(71) Applicant: Samsung Electronics Co., Ltd., Gyeonggi-do (KR)

(72) Inventors: Dong Hyuk Lee, Seoul (KR); Mu-Sik Kwon, Seoul (KR); Jung-Rim Kim, Gyeonggi-do (KR); Seong-Taek Hwang, Gyeonggi-do (KR); Sang-Wook Oh, Gyeonggi-do (KR); Hyun-Soo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/447,130

(22) Filed: Jul. 30, 2014

(65) Prior Publication Data

US 2014/0340307 A1 Nov. 20, 2014

Related U.S. Application Data

(63) Continuation of application No. 12/837,111, filed on Jul. 15, 2010, now abandoned.

(30) Foreign Application Priority Data

Jul. 17, 2009 (KR) .................. 10-2009-0065434

(51) Int. Cl.
*G06K 9/62* (2006.01)
*G06F 3/01* (2006.01)
(Continued)

(52) U.S. Cl.
CPC ............ *G06F 3/017* (2013.01); *G06K 9/00355* (2013.01); *G06T 7/2006* (2013.01);
(Continued)

(58) Field of Classification Search
CPC ..... G06F 3/017; G06T 7/2033; G06T 7/2006; G06T 2207/10016; G06T 2207/10024; G06T 2207/30196
See application file for complete search history.

(56) References Cited

U.S. PATENT DOCUMENTS

2001/0042245 A1 11/2001 Iwamura
2006/0013440 A1 1/2006 Cohen et al.
(Continued)

FOREIGN PATENT DOCUMENTS

CA  WO 0207839  A2 *  1/2002  ............. G06F 3/011
JP  2000-196914  7/2000
(Continued)

OTHER PUBLICATIONS

Jin et al., "GIA: design of a gesture-based interaction photo album", Jul. 2003, Personall and Ubiquitous Computing Journal, vol. 7, iss. 3-4, p. 189-196.*
(Continued)

*Primary Examiner* — Stephen R Koziol
*Assistant Examiner* — Timothy Choi
(74) *Attorney, Agent, or Firm* — The Farrell Law Firm, P.C.

(57) ABSTRACT

A method and an apparatus are provided for displaying pictures according to hand motion inputs. An application is executed for displaying a picture from among a sequence of pictures on a display. Groups of skin color blocks corresponding to a hand are detected from among image frames output from a camera. A motion is detected among the groups of skin color blocks. Direction information is obtained on the detected motion. The application is controlled to display a previous picture or a next picture in the sequence of pictures on the display according to the direction information.

8 Claims, 6 Drawing Sheets

(51) Int. Cl.
*G06K 9/00* (2006.01)
*G06T 7/20* (2006.01)

(52) U.S. Cl.
CPC ..... *G06T7/2033* (2013.01); *G06T 2207/10016* (2013.01); *G06T 2207/10024* (2013.01); *G06T 2207/30196* (2013.01)

(56) References Cited

U.S. PATENT DOCUMENTS

2006/0262958 A1* 11/2006 Yin .................... G06K 9/00771
382/103
2008/0259031 A1 10/2008 Yoshino

FOREIGN PATENT DOCUMENTS

| JP | 2001-307107 | 11/2001 |
|---|---|---|
| WO | WO 02/07839 | 1/2002 |
| WO | WO 2008/018943 | 2/2008 |

OTHER PUBLICATIONS

Al-Rajab et al., "A Comparative Study on Using Zernike Velocity Moments and Hidden Markov Models for Hand Gesture Recognition", 2008, Lecture Notes in Compter Science: Articulated Motion and Deformable Objects, vol. 5098, p. 319-327.*

Chen et al., "Hand gesture recognition using a real-time tracking method and hidden Markov models", Aug. 1, 2003, Image and Vision Computing, vol. 21, iss. 8, p. 745-758.*

Kawato et al., "Automatic skin-color distribution extraction for face detection and tracking", Aug. 25, 2000, 5th Int. Conf. on Signal Processing Proceedings, vol. 2, p. 1415-1418.*

Capin et al: "Camera-Based Virtual Environment Interaction on Mobile Devices", Computer and Information Sciences—ISCIS Lecture Notes in Computer Science, Jan. 1, 2006.

Chen et al., "Hand gesture recognition using a real-time tracking method and hidden Markov models", Aug. 1, 2003, Image and Vision Computing, vol. 21, iss.8, p. 745-758.

Jones et al., "Statistical color models with application to skin detection", Jun. 25, 1999, IEEE Computer Society Conference on Computer Vision and Pattern Recognition, 1999, vol. 1, p. 274-280.

Puri et al., "An efficient block-matching algorithm for motion-compensated coding", Apr. 1987, IEEE International Conference on ICASSP '87, vol. 12, p. 1063-1066.

Rosin, "Thresholding for change detection", Jan. 7, 1998, Sixth International Conference on Computer Vision, 1998, p. 274-279.

Assen et al. "Accurate object localization in gray level images using the center of gravity measure: accuracy versus precision", Dec. 2002, IEEE Transactions on image Processing, vol. 11, iss. 12, p. 1379-1384.

Korean Office Action dated Jun. 24, 2015 issued in counterpart application No. 10-2009-0065434, 12 pages.

* cited by examiner

APPARATUS AND METHOD FOR RECOGNIZING SUBJECT MOTION USING A CAMERA

PRIORITY

This application is a Continuation Application of U.S. patent application Ser. No. 12/837,111, filed on Jul. 15, 2010, which claims priority under 35 U.S.C. §119(a) to a Korean Patent Application filed in the Korean Intellectual Property Office on Jul. 17, 2009 and assigned Serial No. 10-2009-0065434, the entire disclosure of which is hereby incorporated by reference.

BACKGROUND OF THE INVENTION

1. Field of the Invention

The present invention relates generally to an apparatus and method for detecting a subject's motions in captured images, and more particularly, to an apparatus and method for recognizing or detecting a user's hand motions in image frames received from a mobile camera, i.e., a camera embedded in a mobile terminal.

2. Description of the Related Art

Mobile terminals (also known as mobile communication terminals or portable terminals), which were originally developed for voice calls, have evolved into devices that provide many different types of services to users. For example, more recently developed mobile terminals also provide data services such as text messaging, photo and video services, and mobile banking service. Users of mobile terminals with a camera may capture a variety of images with the camera. The mobile terminal with a camera may recognize shapes or patterns in the images, and control an operation of a specific application based on the shape or pattern recognition results.

A conventional hand shape recognition method using a mobile camera predefines recognizable hand shapes or hand patterns, and detects hand shapes in images captured by the camera. More specifically, the mobile terminal searches a database in a memory for a predefined hand shape that best corresponds with the detected hand shape, and triggers an event associated with the search results. Commonly, the conventional hand shape recognition method defines various hand shapes, and diversifies the types of events corresponding to the defined hand shapes.

The conventional hand shape recognition method predefines diverse hand shapes corresponding to input signals, compares a hand shape in the current input image with pre-learned or stored hand shapes, and initiates an event based on the comparison results.

However, for mobile camera-based hand shape recognition applications, it is important to generate hand shape-triggered events that are robust to changes in the use environment. In the conventional hand shape recognition method, a database for hand shape learning and recognition has been implemented under the assumption that in any environment, the background color is not similar to the skin color and part of user's body, like the face, are not covered. Consequently, disturbing factors such as a change in lighting or scale, rotational displacement, background color, or covering, may significantly degrade recognition performance. Additionally, a task such as hand shape recognition demands significant computing resources that are necessarily limited in the mobile environment.

SUMMARY OF THE INVENTION

The present invention is designed to address at least the aforementioned problems and/or disadvantages and to provide at least the advantages described below. Accordingly, aspects of the present invention provide a hand motion-based input method and a hand motion recognition apparatus and method, which are robust to various disturbing factors and high in speed, and can be applied to a variety of mobile applications. This may be accomplished by considering only motion characteristics of a target close in color to the skin in a way, which is robust to diverse disturbing factors like the lighting and scale without separately detecting hand shapes.

In accordance with one aspect of the present invention, a method is provided for displaying pictures according to hand motion inputs. An application is executed for displaying a picture from among a sequence of pictures on a display. Groups of skin color blocks corresponding to a hand are detected from among image frames output from a camera. A motion is detected among the groups of skin color blocks. Direction information is obtained on the detected motion. The application is controlled to display a previous picture or a next picture in the sequence of pictures on the display according to the direction information.

In accordance with another aspect of the present invention, an apparatus is provided for displaying pictures according to hand motion inputs. The apparatus includes a display, and a memory for storing a sequence of pictures. The apparatus also includes a controller configured to: execute an application for displaying a picture from among the sequence of pictures on the display; detect, from among image frames output from a camera, groups of skin color blocks corresponding to a hand; detect a motion among the groups of skin color blocks; obtaining direction information on the detected motion; and control the application to display a previous picture or a next picture in the sequence of pictures on the display according to the direction information.

BRIEF DESCRIPTION OF THE DRAWINGS

The above and other aspects, features and advantages of certain embodiments of the present invention will be more apparent from the following description taken in conjunction with the accompanying drawings, in which:

FIGS. 7A to 8B are diagrams illustrating steps of allocating events.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, descriptions of well-known functions and constructions are omitted for clarity and conciseness.

The present invention provides high-speed hand motion recognition and hand motion-based input method, which is robust to various disturbing factors, and can be applied to various mobile applications, by considering only motion characteristics of a target (i.e., a subject or an object in an image) close in color to the skin, which are robust to a variety of disturbing factors like lighting and scale, by recognizing hand motions (basically, a subject's motions appearing in images) instead of hand shapes in captured images. The term "hand motion-based input" refers to using hand motion recognition results as user interfaces, which may be applied to various applications such as to view photos or play games.

Figure 1:
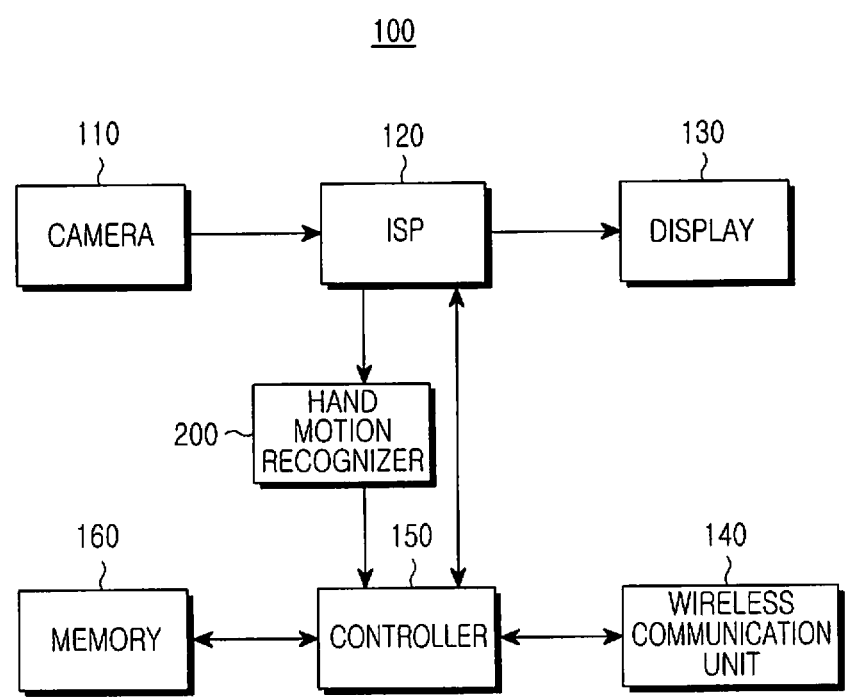
FIG. 1 is a block diagram schematically illustrating a mobile terminal with a hand motion recognizer for recognizing hand motions in input images according to an embodiment of the present invention.

FIG. 1 is a block diagram, which schematically illustrates a mobile terminal including a hand motion recognizer for recognizing hand motions in input images according to an embodiment of the present invention.

Referring to FIG. 1, a mobile terminal 100 includes a camera 110, an Image Signal Processor (ISP) 120, a display 130, a wireless communication unit 140, a hand motion recognizer 200, a controller 150, and a memory unit 160. Although only an overview of the mobile terminal 100 is illustrated in FIG. 1, the mobile terminal 100 may further include a speaker, a microphone, and a user interface device like a keypad.

The camera 110 captures an image of a subject, and detects the captured image in an electrical signal. For this purpose, the camera 110, though not shown here, may include a lens system having at least one lens to form an image of a subject, and an image sensor, such as a Charge-Coupled Device (CCD) image sensor and/or a Complementary Metal-Oxide Semiconductor (C-MOS) image sensor, for converting the image formed on the lens system to an electrical signal.

The ISP 120, under the control of the controller 150, processes image signals received from the camera 110 or images stored in the memory unit 160 on a frame-by-frame basis, and outputs image frames that have been converted according to screen characteristics (size, quality, resolution, etc.) of the display 130.

The display 130 displays image frames received from the ISP 120 on a screen. A Liquid Crystal Display (LCD), a touch screen, or the like may be used as the display 130. The touch screen displays images under the control of the controller 150. If a user input, such as a finger or a stylus pen, comes in contact with its surface, the touch screen generates a key contact interrupt and outputs user input information including input coordinates and input status to the controller 150.

The wireless communication unit 140 receives wireless downlink signals over the air via an antenna, and outputs downlink data obtained by demodulating the wireless downlink signals, to the controller 150. Also, the wireless communication unit 140 generates wireless uplink signals by modulating uplink data received from the controller 150, and wirelessly transmits the generated wireless uplink signals into the air via the antenna. The modulation and demodulation may be carried out using Code Division Multiple Access (CDMA), and may also be performed using Frequency Division Multiplexing (FDM) or Time Division Multiplexing (TDM).

The hand motion recognizer 200 recognizes hand motions from image frames received from the ISP 120, and outputs the recognition results to the controller 150.

The memory unit 160 may store applications with various functions such as games, images for offering Graphical User Interfaces (GUIs) associated with the applications, databases regarding user information and documents, and background images (menu screens, idle screen, etc.) or other programs for operating the mobile terminal 100.

The controller 150 runs an application corresponding to user input information, and the application performs a program operation corresponding to the user input information. The user inputs may include normal inputs made using keypads, touch screens, etc., and camera-based hand motion inputs. For example, if a user moves his hand toward the camera from side to side while a photo album application is running, the photo album application may replace the current photo displayed on the display 130 with the next photo. Such an action might trigger a "Flip Photo Album" event in reply to the hand motion causing the event processing result (i.e., flipping to the next photo) to be displayed on the display 130.

Figure 2:
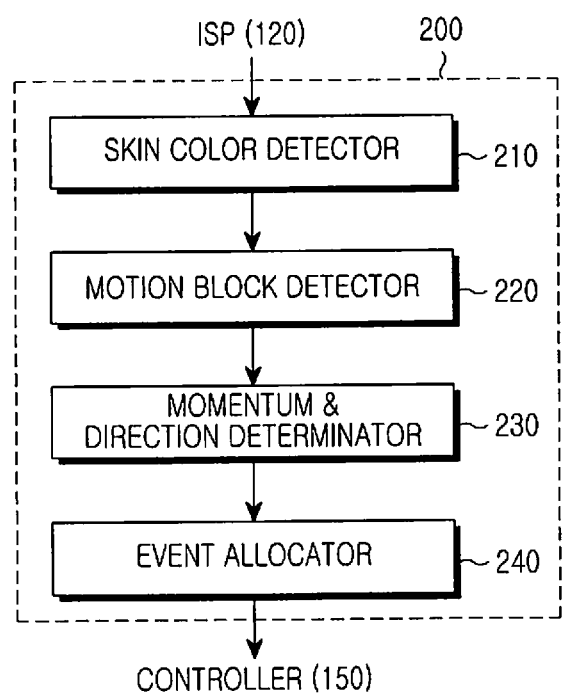
FIG. 2 is a block diagram illustrating a detailed structure of a hand motion recognizer as illustrated in FIG. 1.
Figure 3:
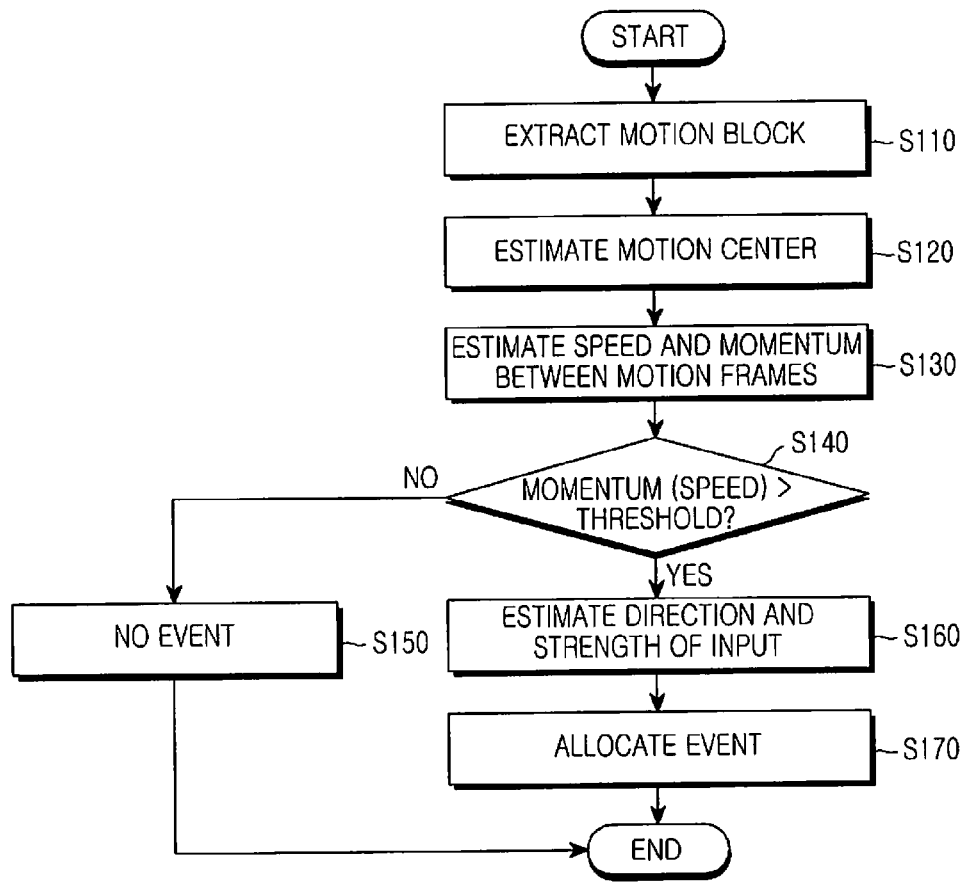
FIG. 3 is a flowchart illustrating a method for recognizing hand motions in input images according to an embodiment of the present invention.

FIG. 2 is a block diagram illustrating a hand motion recognizer 200, and FIG. 3 is a flowchart illustrating a method for recognizing hand motions in input images according to an embodiment of the present invention.

The hand motion recognizer 200 includes a skin color detector 210, a motion block detector 220, a momentum & direction determiner 230, and an event allocator 240. The hand motion recognition method includes a motion block extraction step S110, a motion center estimation step S120, an inter-motion frame speed & momentum estimation step S130, a momentum comparison step S140, an input direction and strength estimation step S160, and an event allocation step S170.

In the motion block extraction step S110, the skin color detector 210 detects skin color blocks (or motion candidate blocks) corresponding to a hand in image frames received from the ISP 120, and the motion block detector 220 detects motion blocks among the skin color blocks.

The skin color detector 210 receives an image frame from the ISP 120, and splits the image frame into blocks each having a predetermined number of pixels in order to reduce noises and computation. This image splitting step may be performed on the entire image frame, or on an area of interest in the image frame displayed on the display 130. The area of interest may be determined by the user or the controller 150. Also, the area of interest may be automatically set according to, for example, a default value stored in the memory unit 160. The image splitting step is a virtual step, and the image frame is split into, for example, N*M blocks and processed in the hand motion recognizer 200 on a block-by-block basis. For example, each of the blocks may have a size of 8*8 or 16*16 pixels.

The skin color detector 210 detects pixels (hereinafter, skin color pixels) close in color to the skin among the pixels included in each block, and determines a certain block as a skin color block if the number of the detected skin color pixels is greater than or equal to a predetermined ratio (e.g., 60 to 80%) of the total number of pixels in the block.

For example, when the image frame is expressed in an YCrCb format (or color model), the skin color detector 210 can determine skin color pixels, using Equation (1) below.

$$Cb>(76-SkinColorMargin) \&\& Cb<(128+SkinColorMargin) \&\& Cr>(132-SkinColorMargin) \&\& Cr<(174+SkinColorMargin) \quad (1)$$

A SkinColorMargin value may be set to 10 so that it may include a color value similar to that of the skin color, and the specific figures in Equation (1) are given by way of example.

Thus, the skin color detector 210 determines whether or not a color value of each pixel satisfies Equation (1) or if it falls within a threshold range.

The motion block detector 220 detects motion pixels among the pixels included in each skin color block, and determines the skin color block as a motion block if the number of the detected motion pixels is greater than or equal to a predetermined ratio of the total number of pixels in the block. This motion block detection step is performed on the current image frame and the previous image frame on the basis of the current image frame at a sampling time of each image frame. The motion block detector 220 compares each pixel value (or a brightness value) of a skin color block in the current image frame with a pixel value of the same pixel in the previous image frame and determines the pixel to be a motion pixel if the difference between the pixel values is greater than or equal to a predetermined pixel threshold (e.g., 10~30 in the YCrCb format). The motion block detector 220 determines a pertinent skin color block as a motion block if the number of motion pixels included in each skin color block is greater than or equal to a predetermined block threshold or a predetermined ratio (e.g., 60 to 80%) of the total number of pixels in the skin color block.

The reason for detecting motion blocks from among the skin color blocks in this embodiment (instead of simply estimating motions of the skin color blocks) is to extract only the target having a relatively large motion because the image frame may contain the user's face in addition to his or her moving hand. Therefore, the motion block estimation (or matching) step described above is optional depending on the use environment of the present invention, or the features of the application.

In addition, the skin color blocks are detected in order to exclude a motion of the background in the image frame. Thus, the above-described skin color block detection step is also optional depending on the use environment of the present invention, or the features of the application.

While a user's hand is described above as an example of the target subjected to motion estimation, motions of other targets, like a face, may also be estimated depending on the input method of the application.

In the motion center estimation step S120, the momentum & direction determiner 230 estimates the central point (or motion center) for all motion blocks in each of the image frames. Such a central point may be determined as the center of the whole distribution area of the motion blocks, the center of an area where the motion blocks are crowded, or the center given by a combination of both methods. For example, every area may be given a different weight depending on the density of motion blocks.

In the inter-frame speed and momentum estimation step S130, the momentum & direction determiner 230 calculates the speed and the momentum of a hand motion based on a distance between the motion centers of the current and previous image frames. For example, the hand motion recognition may be achieved by simply calculating the distance between the motion centers of the current and previous image frames. That is, a speed of the hand motion is expressed in the distance between the motion centers as described below, and in the case of a simple application, hand motion inputting may be completed by simply estimating the hand motion's speed. Estimating the momentum, strength, direction, and hand motion speed offers a variety of events according to the state of the hand motion.

If coordinates of the motion centers of the current and previous image frames are defined as $\{x1, y1\}$ and $\{x2, y2\}$, respectively, then a speed of the hand motion can be written as Equation (2) below.

$$\text{Speed}=\text{sqrt}(x1-x2)*(x1-x2)+(y1-y2)*(y1-y2)) \qquad (2)$$

In Equation (2), sqrt( ) represents a square root function, and the speed is expressed in a distance between motion centers. In this context, a time difference between image frames being input to the hand motion recognizer 200, i.e., a sampling interval between the image frames, is constant, and the speed and momentum of the hand motion are meaningful as relative values for comparison, so the sampling interval is omitted in Equation (2). Thus, the "speed" of the hand motion corresponds to the distance of the hand motion, or the magnitude of a motion vector.

A moment used to calculate a momentum of the hand motion can be written as Equation (3) below.

$$\text{Moment}=\text{Max}(N_{MB\_current}, N_{MB\_Previous}) \qquad (3)$$

In Equation (3), $N_{MB\_current}$ represents the number of motion blocks in the current image frame, $N_{MB\_Previous}$ represents the number of motion blocks in the previous image frame, and Max( ) represents a function for calculating the maximum value among factors.

Although the maximum value function Max( ) is used above to calculate the momentum of the hand motion, an average function may be used in the alternative.

The momentum P calculated using the speed and moment of the hand motion can be written as Equation (4) below.

$$P(\text{momentum})=\text{Moment}*\text{Speed} \qquad (4)$$

In the momentum comparison step S140, the momentum & direction determiner 230 compares the momentum of the hand motion with a predetermined momentum threshold. If the momentum is less than or equal to the threshold, the momentum & direction determiner 230 does not perform the input's direction & strength estimation step in step S150, determining that the hand motion is invalid. If the momentum exceeds the threshold, the momentum & direction determiner 230 performs the input direction and strength estimation step S160. The mobile terminal would use the square root value (or an approximation thereof) to determine Speed, or the value of Speed squared may be substituted increase computational efficiency.

While the description above considers the number of motion blocks and the hand motion's speed in the momentum comparison step S140 to accurately determine the presence/absence of a hand motion input, this comparison step may be optionally replaced by comparing only the speed.

In the input direction and strength estimation step S160, the momentum & direction determiner 230 estimates direction and strength of the hand motion. For example, for $(x1-x2)>0$, the momentum & direction determiner 230 may determine that the hand motion was made in the right direction (or +x direction), while for $(x1-x2)<0$, the momentum & direction determiner 230 may determine that the hand motion was made in the left direction (or −x direction). A decision on the up-down direction (y-axis direction) may be made in the same manner. In addition, for $(x1-x2)/(y1-y2)>1$, the momentum & direction determiner 230 may determine the direction on the x-axis as stated above, determining that the hand motion was made in the left-right direction (x-axis direction), while for $(x1-x2)/(y1-y2)<1$, the momentum & direction determiner 230 may determine the direction on the y-axis as stated above, determining that the hand motion was made in the up-down direction (y-axis direction).

Figure 4A:
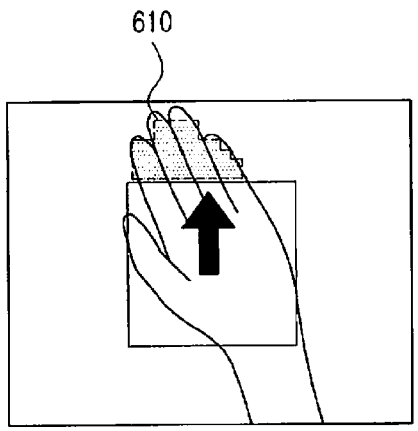
FIGS. 4A to 4D are diagrams illustrating steps of estimating directions of hand motions.
Figure 4B:
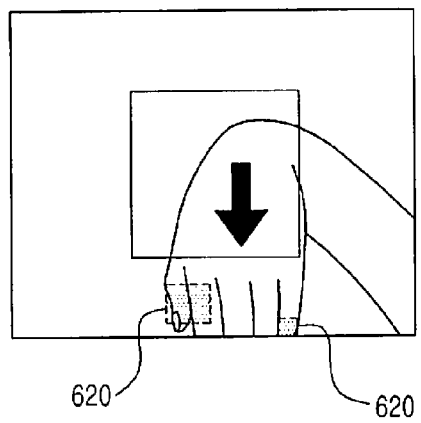
Figure 4C:
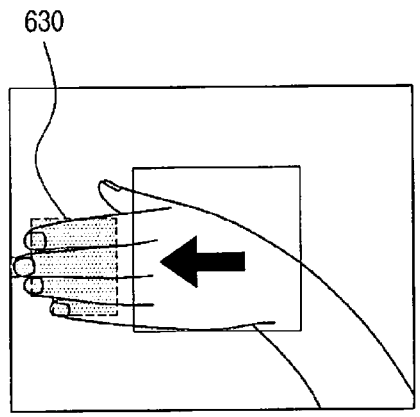

FIGS. 4A to 4D illustrate a process of estimating hand motion directions. In FIGS. 4A to 4D, the arrows indicate the directions of hand motions, and motion blocks 610 to 640 are estimated based on the hand motions. FIG. 4A illustrates an image frame of a user making an upward hand motion, and the motion blocks 610 corresponding thereto. FIG. 4B illustrates an image frame of a user making a downward hand motion, and the motion blocks 620 corresponding thereto. FIG. 4C illustrates an image frame of a user making a leftward hand motion, and the motion blocks 630 corresponding thereto.

Figure 4D:
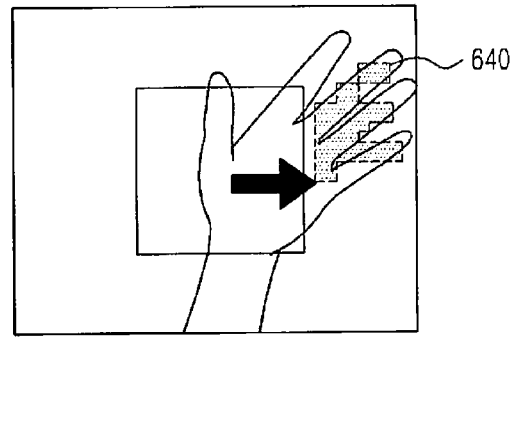

FIG. 4D illustrates an image frame of a user making a rightward hand motion, and the motion blocks 640 corresponding thereto. As illustrated in FIGS. 4A to 4D, a group of motion blocks lean toward the direction in which the user made the hand motion, making it possible to estimate the direction of the hand motion by identifying the center of the motion block group.

The momentum & direction determiner 230 estimates the strength (or magnitude) of the momentum by comparing the momentum with a predetermined threshold range. For example, if the strength of the momentum is greater than the threshold and less than 10 in the momentum comparison step S140, the strength is determined as level-1 strength. If the strength of the moment is greater than or equal to 10 and less than 20, the strength is determined as level-2 strength. If the strength of the momentum is greater than or equal to 20 (another threshold corresponding to the top limit may be set), the strength is determined as level-3 strength.

Figure 5A:
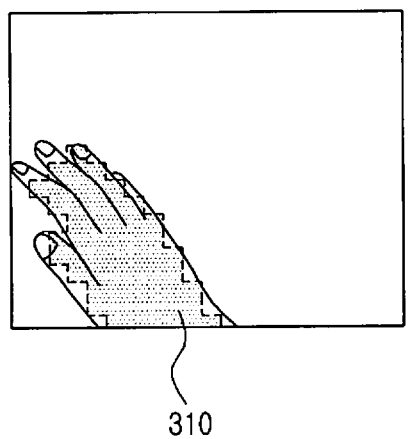
FIGS. 5A to 6B are diagrams illustrating steps of determining strengths of momentums.
Figure 5B:
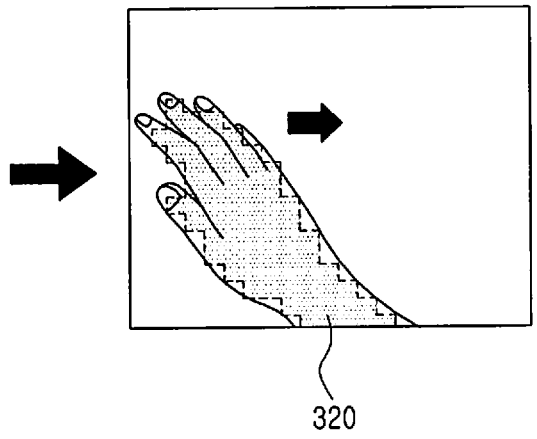

FIGS. 5A to 6B are diagrams illustrating steps of determining strengths of momentums. In FIGS. 5A to 6B, the arrows in the image frames represent the directions and strengths of the hand motions. FIGS. 5A and 5B illustrate a situation where level-1 strength occurs as the user makes a hand motion from left to right at low speed. It is noted that a difference between the center of a motion block group 310 in the previous image frame illustrated in FIG. 5A and the center of a motion block group 320 in the current image frame illustrated in FIG. 5B is not so large.

Figure 6A:
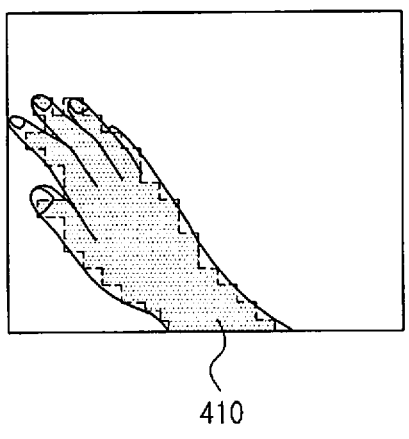
Figure 6B:
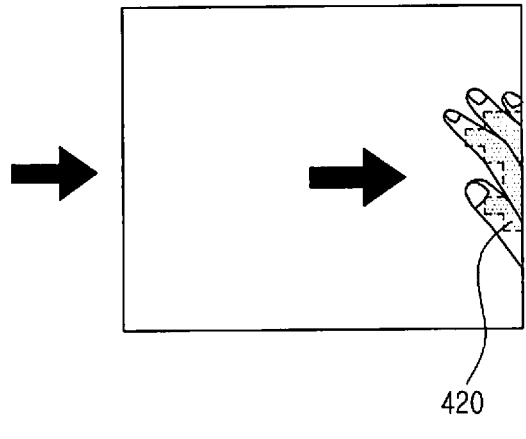
Figures 7A, 7B, 7C, 7D:
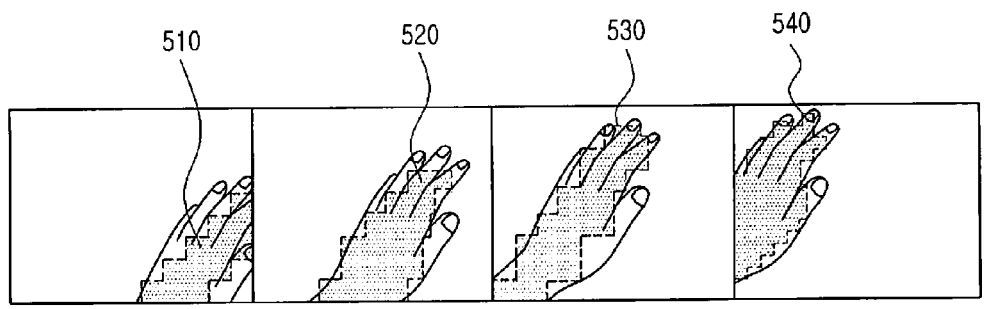

FIGS. 6A and 6B illustrates a situation where level-3 strength occurs as the user makes a hand motion from left to right at high speed. It can be appreciated that a difference between the center of a motion block group 410 in the previous image frame illustrated in FIG. 6A and the center of a motion block group 420 in the current image frame illustrated in FIG. 6B is relatively large.

In the event allocation step S170, the event allocator 240 generates an event allocated to the direction and strength of the momentum, determined in the input direction and strength estimation step S160. For example, this event may signal a photo album application to "flip" the "pages" of an album. In this case, the controller 150 may display the execution results of the Flip Photo Album event, i.e., the next photo, on the display 130.

Figures 8A, 8B:
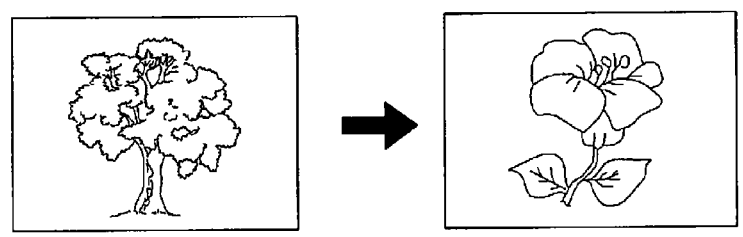

FIGS. 7A to 8B are diagrams illustrating steps of allocating events. FIGS. 7A to 7D illustrate four successive image frames. In FIGS. 7A to 7D, the arrows indicate the directions of hand motions, and motion blocks 510 to 540 are estimated based on the hand motions. The event allocator 240 generates a Flip Photo Album event (i.e., a Page Up event) in reply to the leftward hand motion appearing in the image frames, and the execution results of the Flip Photo Album event are illustrated in FIGS. 8A and 8B. That is, the previous photo illustrated in FIG. 8A is replaced with the current photo illustrated in FIG. 8B. If the user makes a rightward hand motion, a Flip Photo Album event (i.e., a Page Down event) is generated to replace the photos in the opposite direction. For example, in a cartoon application, if a Page Up event occurs, the page is flipped from 10 to 11, whereas if a Page Down event occurs, the page is flipped from 10 to 9.

As is apparent from the foregoing description, in order to run mobile applications depending on the most intuitive hand motions, in accordance with an embodiment of the present invention image blocks similar in color to the skin are set as interested motion candidate blocks, the motion blocks are extracted from the interested motion candidate blocks using the motion block detector, the center of the motion blocks is calculated, and the speed and momentum of the hand motions are estimated based on a difference between the centers of motion blocks in different motion frames and the number of motion blocks. The estimated data may be applied to a variety of mobile applications. For example, the estimated data can be applied to a mobile camera-based User Interface (UI) for viewing photos that is responsive to hand motions. In addition, the embodiments of the present invention can preset event timing, sense the position where a hand motion occurs at the cycle of the event timing, and allocate an event based thereon, thereby supporting hand-face guessing games like the Korean game Cham-Cham-Cham. The present invention could also be used for Olympic-type games (broad jump, hurdle race, etc.) in which events are generated depending upon the frequency and timing of hand motions, and other sports games (tennis, ping-pong, etc.) in which events are generated depending on the strength and timing of hand motions. Accordingly, the embodiments of the present invention can be applied to a variety of games and UIs that detect and determine up/down/left/right directions.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for displaying pictures according to hand motion inputs, comprising:
   executing an application for displaying a picture from among a sequence of pictures stored in a memory on a display;
   detecting, from a current image frame output from a camera, skin color blocks corresponding to a hand;
   detecting a group of motion blocks from the skin color blocks;
   detecting a motion of the group of motion blocks;
   obtaining momentum information on the detected motion; and
   controlling the application to display a previous picture or a next picture in the sequence of pictures on the display according to the momentum information,
   wherein the skin color blocks are detected by:
      detecting skin color pixels from each of a plurality of image blocks included in the current image frame, each of the skin color pixels having a color value falling within a first threshold range; and
      detecting the skin color blocks from among the plurality of image blocks by comparing a number of the detected skin color pixels in each of the plurality of image blocks with a first threshold, and
   wherein the group of motion blocks are detected by:
      detecting motion pixels from each of the skin color blocks, a difference between a pixel value of each of the motion pixels in the current image frame and a pixel value of each of the motion pixels in a previous image frame output from the camera falling within a second threshold range; and
      detecting the group of motion blocks from among the skin color blocks by comparing a number of the detected motion pixels in each of the skin color blocks with a seconded threshold, and
   wherein the momentum information is obtained by calculating momentum based upon the number of motion blocks and a distance between motion pixels in the current image frame and motion pixels in a previous image frame.

2. The method of claim 1, wherein the previous picture in the sequence of pictures is displayed on the display when a direction of the motion is a first direction, and wherein the next picture in the sequence of pictures is displayed on the display when the direction of the motion is a second direction opposite to the first direction.

3. The method of claim 1, further comprising:

obtaining speed information on the detected motion, wherein a current picture in the sequence of pictures is switched with the previous picture or the next picture according to the momentum information and the speed information.

4. The method of claim 1, further comprising:

obtaining speed information on the detected motion; and determining, from among a plurality of speed levels, a speed level corresponding to the speed information, wherein a current picture in the sequence of pictures is switched with the previous picture or the next picture according to the momentum information and the determined speed level.

5. An apparatus for displaying pictures according to hand motion inputs, comprising:

a display;

a memory for storing a sequence of pictures;

a controller configured to:

execute an application for displaying a picture from among the sequence of pictures on the display;

detect, from a current image frame output from a camera, skin color blocks corresponding to a hand;

detect a group of motion blocks from the skin color blocks;

detect a motion of the group of motion blocks;

obtaining momentum information on the detected motion; and control the application to display a previous picture or a next picture in the sequence of pictures on the display according to the momentum information, wherein the controller is configured to detect the skin color blocks by:

detecting skin color pixels from each of a plurality of image blocks included in the current image frame, each of the skin color pixels having a color value falling within a first threshold range; and detecting the skin color blocks from among the plurality of image blocks by comparing a number of the detected skin color pixels in each of the plurality of image blocks with a first threshold, and wherein the controller is configured to detect the group of motion blocks by:

detecting motion pixels from each of the skin color blocks, a difference between a pixel value of each of the motion pixels in the current image frame and a pixel value of each of the motion pixels in a previous image frame output from the camera falling within a second threshold range; and detecting the group of motion blocks from among the skin color blocks by comparing a number of the detected motion pixels in each of the skin color blocks with a second threshold, wherein the momentum information is obtained by calculating momentum based upon the number of motion blocks and a distance between motion pixels in the current image frame and motion pixels in a previous image frame.

6. The apparatus of claim 5, wherein the previous picture in the sequence of pictures is displayed on the display when a direction of the motion is a first direction, and wherein the next picture in the sequence of pictures is displayed on the display when the direction of the motion is a second direction opposite to the first direction.

7. The apparatus of claim 5, wherein the controller is configured to obtain speed information on the detected motion, wherein a current picture in the sequence of pictures is switched with the previous picture or the next picture according to the momentum information and the speed information.

8. The apparatus of claim 5, wherein the controller is configured to:

obtain speed information on the detected motion; and determine, from among a plurality of speed levels, a speed level corresponding to the speed information, wherein a current picture in the sequence of pictures is switched with the previous picture or the next picture according to the momentum information and the determined speed level.

* * * * *